United States Patent
Huang

(10) Patent No.: US 6,561,660 B2
(45) Date of Patent: May 13, 2003

(54) LIGHT GUIDING DEVICE OF A LIQUID CRYSTAL DISPLAY

(75) Inventor: Kuo Jui Huang, Chia-Yi Hsien (TW)

(73) Assignee: Wintek Corporation, Taichung (TW)

( * ) Notice: Subject to any disclaimer, the term of this patent is extended or adjusted under 35 U.S.C. 154(b) by 36 days.

(21) Appl. No.: 09/888,546

(22) Filed: Jun. 26, 2001

(65) Prior Publication Data

US 2002/0196617 A1 Dec. 26, 2002

(51) Int. Cl.[7] .............................. G01D 11/28
(52) U.S. Cl. ........................ 362/27; 362/31; 349/65
(58) Field of Search ..................... 362/26, 27, 31; 349/65

(56) References Cited

U.S. PATENT DOCUMENTS 6,283,602 B1 * 9/2001 Kawaguchi et al. .......... 362/26
6,286,970 B1 * 9/2001 Egawa et al. ................ 362/31

* cited by examiner

Primary Examiner—Stephen Husar
(74) Attorney, Agent, or Firm—Rosenberg, Klein & Lee

(57) ABSTRACT

A light guiding device of a liquid crystal display is disclosed. A liquid crystal module is installed with a light guiding module. The light guiding plate of the light guiding module has a refracting portion at one side. The middle section of the refracting portion is protruded out. A light guide bar has a light outlet surface at the side near the light guiding plate. The light outlet surface is a cambered concave surface. The middle section of the light outlet surface causes a thickness of the light guide bar to be thinner and thickness at two ends thereof bar being thicker. The light guide bar has a reflecting surface. Near the side of the light guide bar is installed with a cambered reflecting mask. Two ends of the light guide bar is installed with a respective LED point light source.

4 Claims, 6 Drawing Sheets

LIGHT GUIDING DEVICE OF A LIQUID CRYSTAL DISPLAY

FIELD OF THE INVENTION

The present invention relates to a light guiding device of a liquid crystal display, and especially to light guiding device of a liquid crystal display having a liquid crystal module which has the structures for focusing light and reflecting light.

BACKGROUND OF THE INVENTION

In the front light liquid crystal display, high luminous LEDs are used to replace CCFLs since the LEDs are power saving. Because LEDs are point light sources, if it is desired to convert the LEDs to become uniform light source, the light guiding module illustrated in FIG. 5 is necessary. In using such kind of liquid crystal display, since the light outlet surface 811 of the light guide bar 81 is a plane, light from the LED light source 82 is reflected on the light guiding plate 812 on the light outlet surface 811, and part of light is reflected on the reflecting surface 812 and then reflected on the light guiding plate 83. Since the reflecting light from the light guiding plate 83 travels to the liquid crystal module (not shown) so that the liquid crystal module is luminous. Since the light outlet surface 811 of the light guide bar 82 has a plane shape and has a smaller reflecting angle α, light is easily scattered (the light outlet angle is about ±45 degrees) so that a large part of the light is scattered out of the light guiding plate 83. Therefore, much of the light is lost and the liquid crystal display has a bad luminous. Furthermore, in the transferring process, since loss in the transmission of the light, the light is difficult to be transferred to another end of the light guide bar 81. Therefore, the light reflecting to the light guiding plate 83 is not uniform and the illumination of the liquid crystal display is not uniform.

With reference to FIG. 6, a further prior art for improving the illumination of the light guiding module of a liquid crystal display is illustrated. In this prior art, he light guide bar 91 has a larger outer diameter near the LED light source 92, and another end has a smaller outer diameter so as to have a wedge shape. The light outlet surface 93 is extended obliquely. Although this is helpful for reflecting the light of the LED light source 92 to another end of the light guide bar 91 for increasing the uniform of the illumination of the light, while a large part of the reflected light will diffusing out of the light guiding plate 91. As a result, the illumination of the liquid crystal display is not preferred.

SUMMARY OF THE INVENTION

Accordingly, the primary object of the present invention is to provide a light guiding device of a liquid crystal display, wherein by the curved surface of the light outlet surface of the light guide bar, reflected light is more uniformly and scattering of the reflected light is reduced. Moreover, the refracting portion of the light guiding plate 21 refracts the light so that the reflecting lights and transmitting light are refracted and concentrated on the light guiding plate. Consequently, the efficiency of light is improved.

Another object of the present invention is to provide a light guiding device of a liquid crystal display, wherein light guiding plate of the light guiding module has two sides which are connected to the two ends of the light guide bar through a respective connecting portion. Therefore, they may be manufactured conveniently.

To achieve above objects, the present invention provides a light guiding device of a liquid crystal display. A liquid crystal module is installed with a light guiding module. The light guiding plate of the light guiding module has a refracting portion at one side. The middle section of the refracting portion is protruded out. Besides, a light guide bar is installed near the refracting portion and faces the side adjacent to the light guiding grooves. The light guide bar has a light outlet surface at the side near the light guiding plate. The light outlet surface 241 is a cambered concave surface. The middle section of the light outlet surface causes a thickness of the light guide bar to be thinner and thickness at two ends of the light guide bar being thicker. The light guide bar has a reflecting surface at a surface other than the light outlet surface; the reflecting surface having a plurality of reflecting grooves. Near the side of the light guide bar different from the side facing the light guiding plate and adjacent to the reflecting surface being installed with a cambered reflecting mask. Two ends of the light guide bar being installed with a respective LED point light source.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
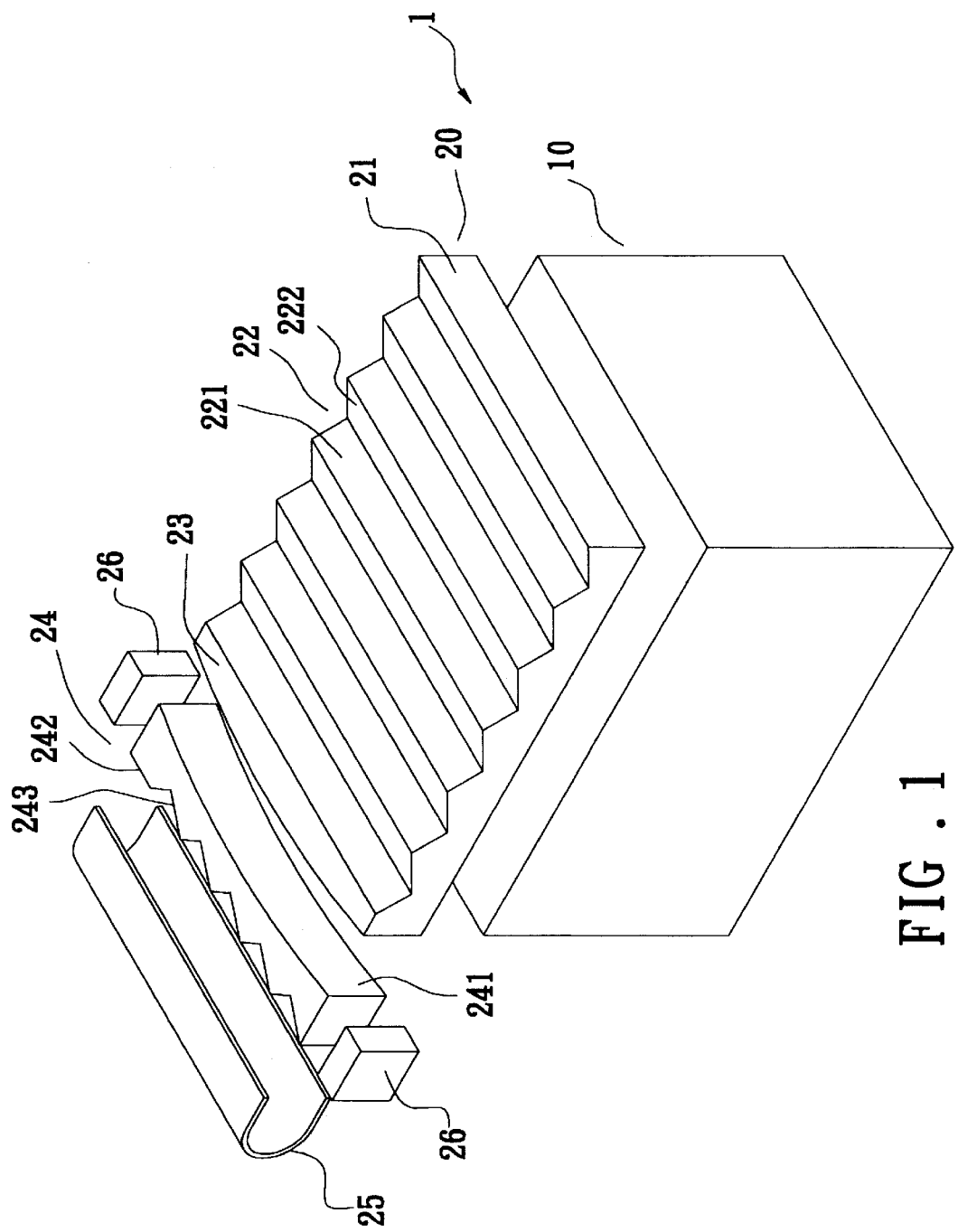
FIG. 1 is a schematic perspective view of the first embodiment in the present invention.
Figure 2:
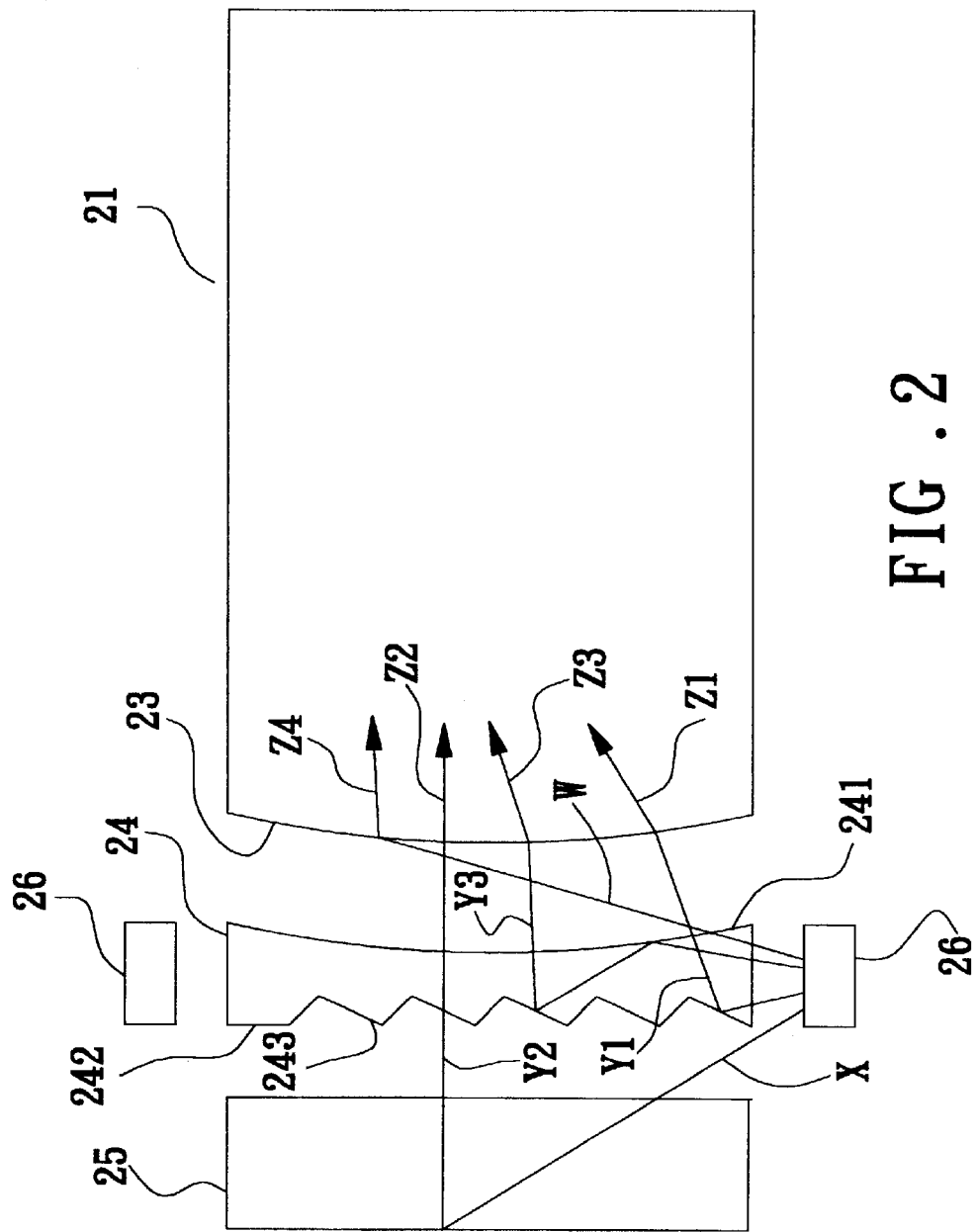
FIG. 2 is a top schematic view of the first embodiment in the present invention.
Figure 3:
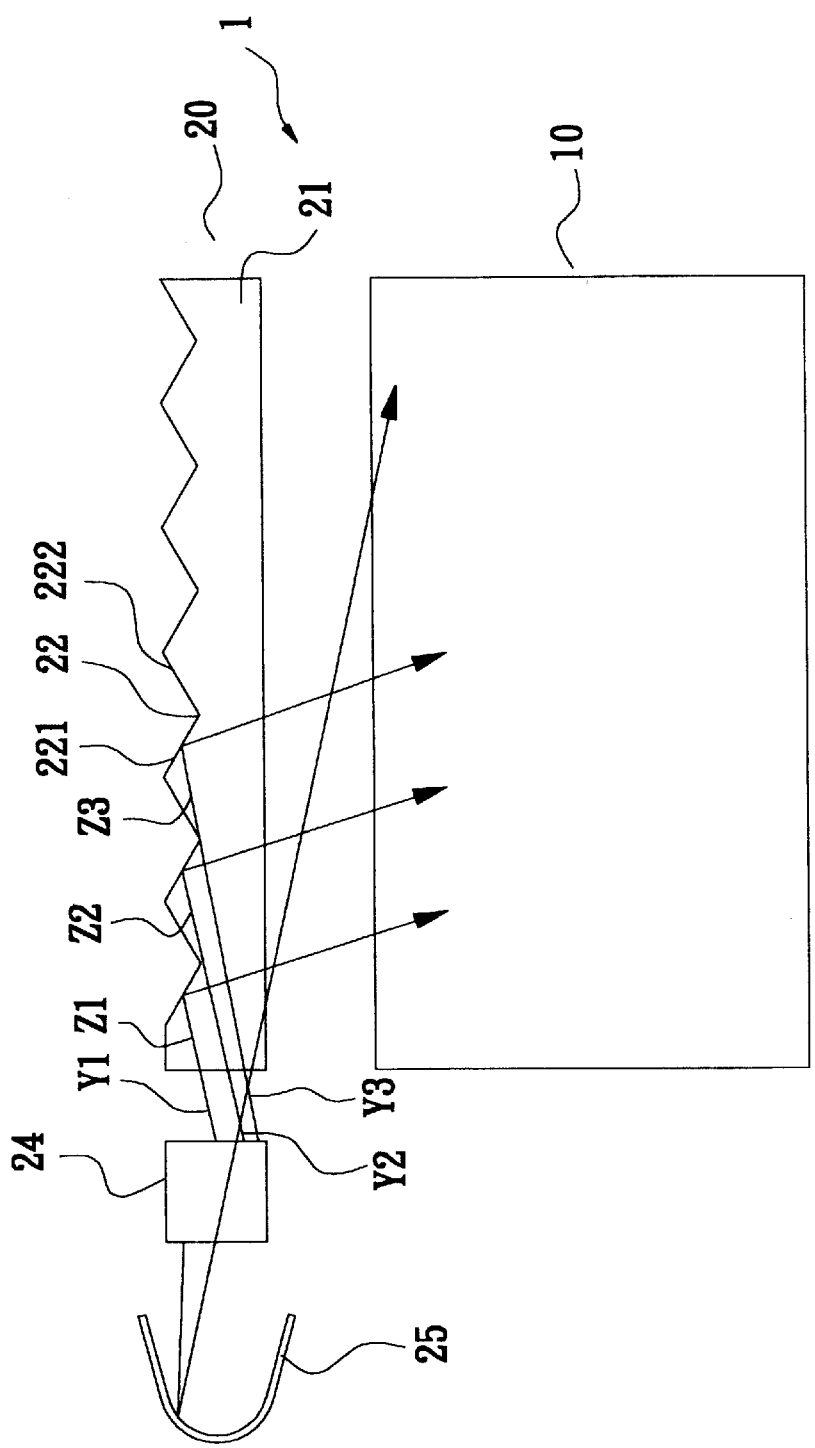
FIG. 3 is a lateral schematic view of the first embodiment in the present invention.

Referring to FIGS. 1 to 3, the front light liquid crystal display 1 of the present invention is illustrated. The liquid crystal display 1 has a liquid crystal module 10 having a plane shape. The top of the liquid crystal module 10 is installed with a light guiding module 20. The light guiding module 20 has a light guiding plate 21. The top of the light guiding plate 21 has a plurality of light guiding grooves 22 which are oriented at the same direction and arranged regularly. The light guiding groove 22 is installed with a first surface 221 and a second surface 222. An angle is formed between the first surface 221 and the second surface 222. The light guiding plate 21 has a refracting portion 22 oriented at a direction identical to the arranging direction of the light guiding groove 22. The refracting portion 23 has a round cambered protrusion at a middle section. A light guide bar 24 is installed near an adjacent side of the light guiding groove 22 of the refracting portion 23. The light guide bar 24 has a light outlet surface 241 at the side near the light guiding plate 21. The light outlet surface 241 is a cambered concave surface. The radius of curvature of the light outlet surface 241 is between 0.001 to 0.01. The middle section of the light outlet surface 241 will cause the thickness of the light guide bar 24 to be thinner and the thickness at two ends of the light guide bar 24 are thicker. The light guide bar 24 has a reflecting surface 242 at a surface other than the light outlet surface 241. The reflecting surface 242 has a plurality of reflecting grooves 243. The angle of the opening of each reflecting groove 243 is between 80 degrees and 100 degrees. Near the side of the light guide bar 24 different from the side facing the light guiding plate 21 and adjacent to the reflecting surface 242 is installed with a cambered reflecting mask 25 which is coaxial to the light guide bar. Two ends of the light guide bar 24 are installed with a respective light source 26. Each light source 26 is an LED point light source.

The present invention is a front light liquid crystal display, and two light sources 26 emit lights X. The light X diffuses. Therefore, some light X directly emits toward the reflecting surface 242 of the light guide bar 24 and is then refracted by the light reflecting groove 243 of the reflecting surface 242 so as to be emitted toward the light guiding plate 21 to be formed as a reflecting light Y1. Besides, part of the light X will pass through the reflecting surface 242 of the light guide bar 24 and is then reflected by the reflecting mask 25. Then the light passes through the light guide bar 24 toward the light guiding plate 21 so as to be formed with a reflecting light Y2. Furthermore, since the light source emits diffusing light, part of light X emits toward the light outlet surface 241 of the light guide bar 24. Part of light X may directly pass through the light outlet surface 241 to be formed as transmitting light W, while part of light X is reflected by the light outlet surface 241 toward the reflecting surface 242. The reflecting surface 242 refracts the light. Then the light passes through the light outlet surface 241 to be formed as reflecting light Y3 which then arrives the light guiding plate 21. Since the refracting portion 23 of the light guiding plate 21 has an effect of convex lens, it may refract the incident reflecting lights Y1, Y2 and Y3 and transmitting light W so as to be formed with refracting lights Z1, Z2, Z3 and Z4 which are more similar to straight light. In the light guiding plate 21, the refracting lights Z1, Z2, Z3 and Z4 are reflected downwards or directly forward to the liquid crystal module 10 so that the liquid crystal module 10 has more uniformly illuminated.

It should be noted that the light outlet surface 241 of the light guide bar 24 is inward concave, and thus the light X is easy reflected at this surface. The scattering light X will be reflected at the middle section of the light outlet surface 241 of the light guide bar 24. Although the light X will lose in traveling (less light travels to the middle section of the light guide bar 24). In the present invention, the light outlet surface 241 can reflect part of light to the reflecting surface 242. This light is reflected by the light reflecting groove 243 of the reflecting surface 242 and having a larger opening, and thus the light outlet angle of the reflecting light is between ±20 to 30 degrees so that the reflecting light is more concentrated. As a result, the efficiency of the light is improved. Therefore, the illumination of the liquid crystal display is increased and is more uniform.

In summary, in the present invention, by the curved surface of the light outlet surface 241 of the light guide bar 24, reflected light is more uniformly and scattering of the reflected light is reduced. Moreover, the refracting portion 23 of the light guiding plate 21 refracts the light so that the reflecting lights Y1, Y2, Y3 and Y4 and transmitting light W are refracted and concentrated on the light guiding plate 21. Consequently, the efficiency of light is improved.

Figure 4:
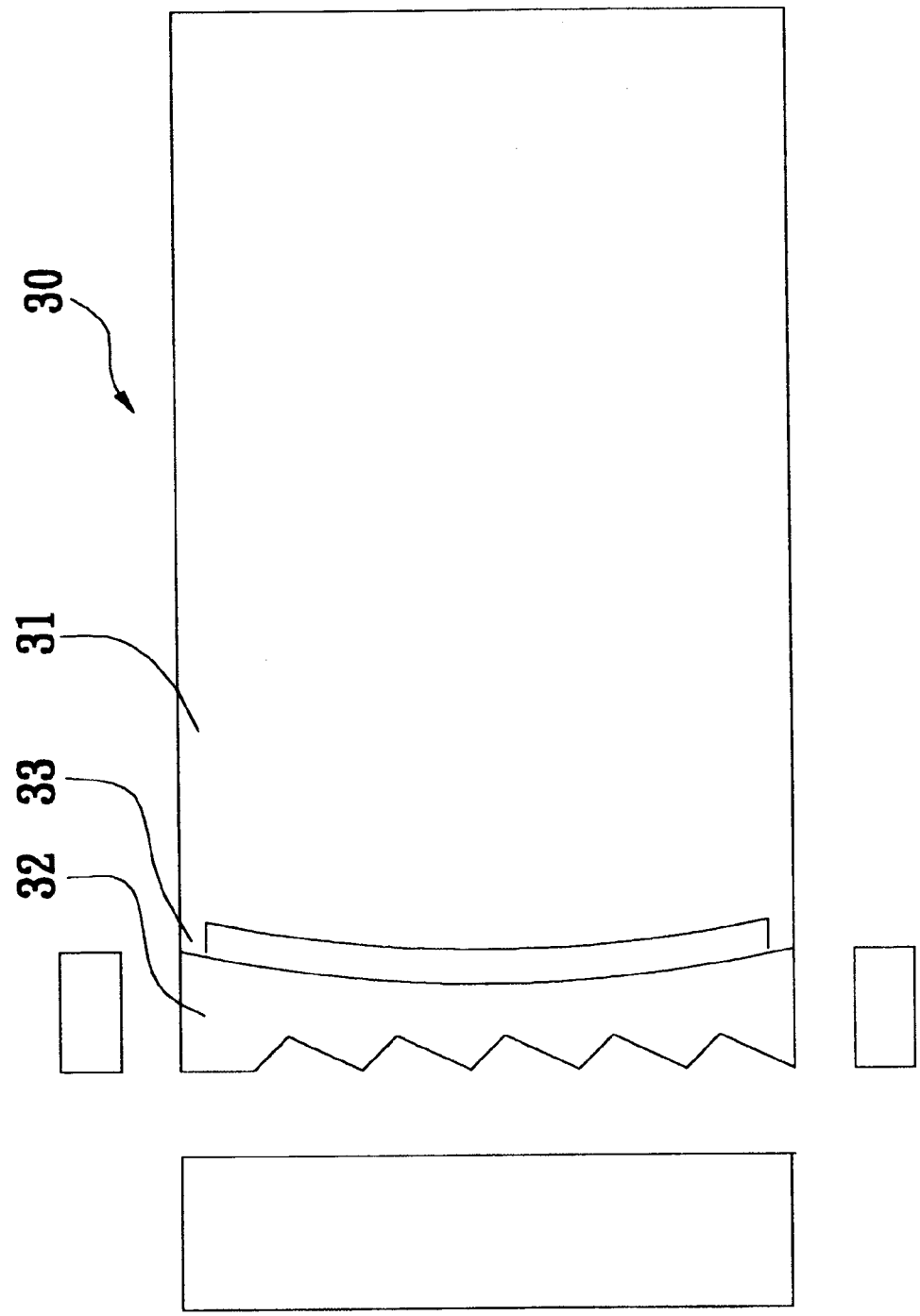
FIG. 4 is a top schematic view of the second embodiment in the present invention.
Figure 5:
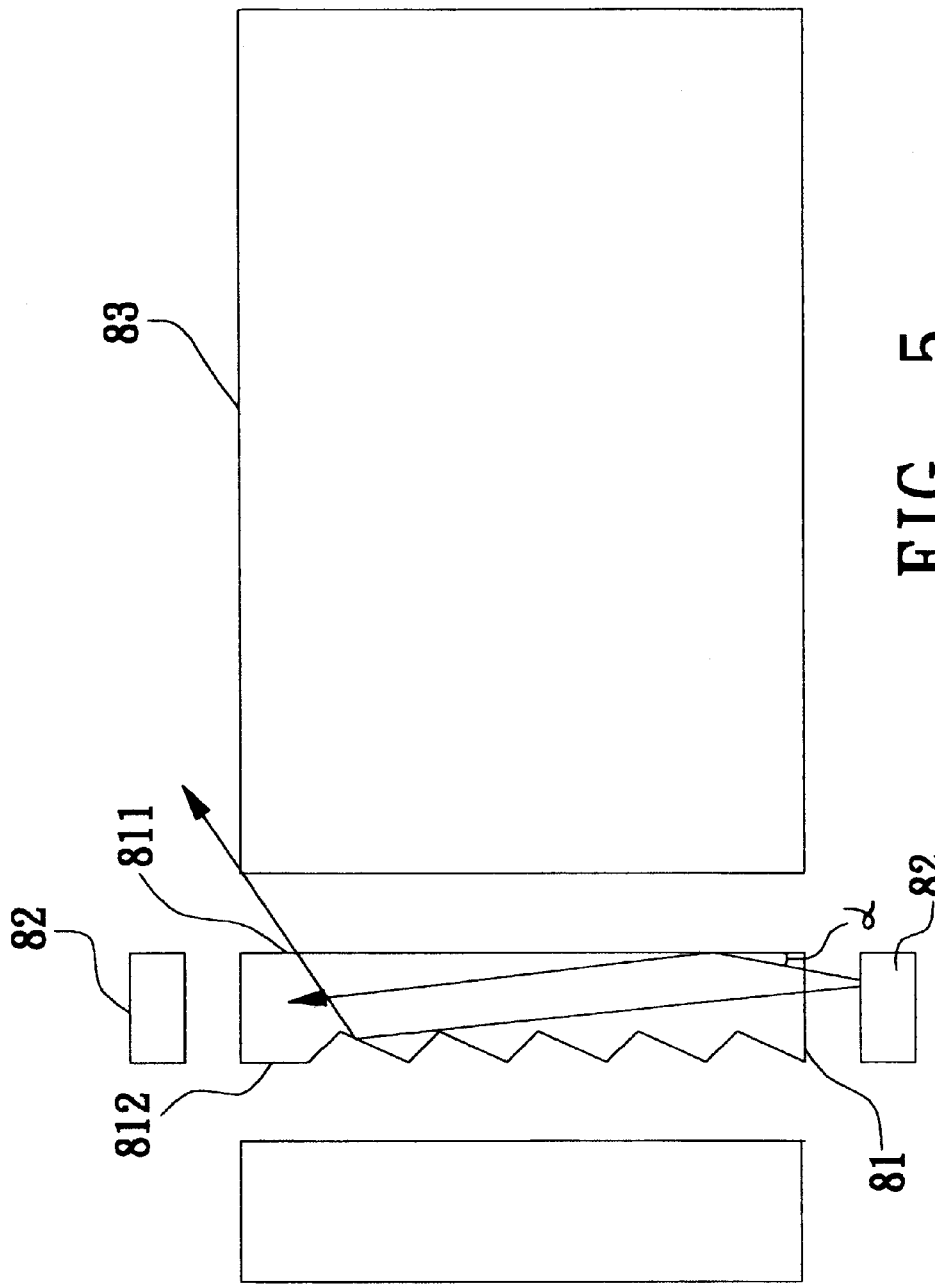
FIG. 5 is a top schematic view of a prior art liquid crystal module.
Figure 6:
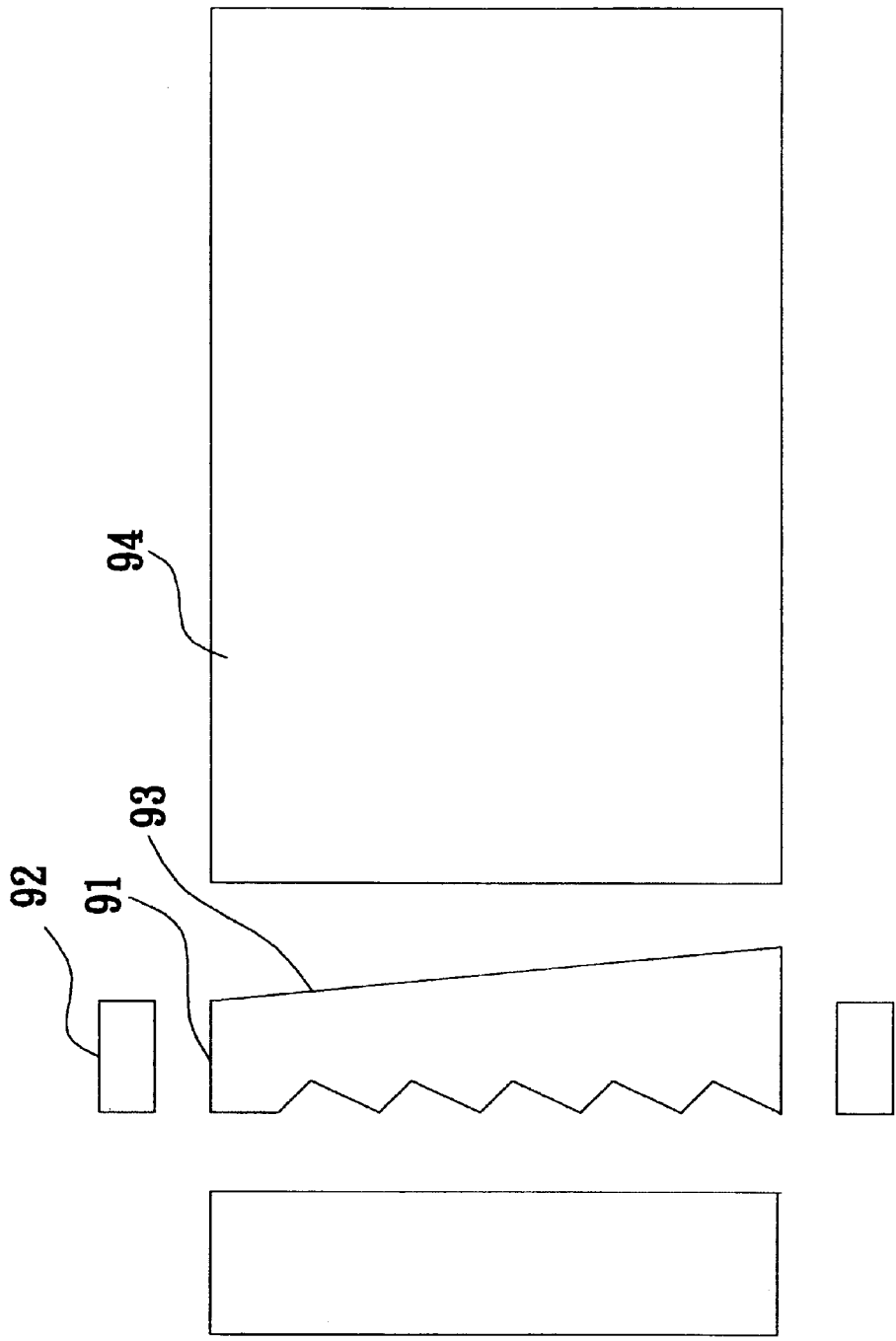
FIG. 6 is a top schematic view of another prior art liquid crystal module.

The present invention are thus described, it will be obvious that the same may be varied in many ways. Such as a second embodiment illustrated in FIG. 4, in that the light guiding plate 31 of the light guiding module 30 has two sides which are connected to the two ends of the light guide bar 32 through a respective connecting portion 33 so that the light guide bar 34 of the light guiding module 30 is integral formed with the light guiding plate 31. Therefore, they may be manufactured conveniently. Such variations are not to be regarded as a departure from the spirit and scope of the present invention, and all such modifications as would be obvious to one skilled in the art are intended to be included within the scope of the following claims.

What is claimed is:

1. A light guiding device for a liquid crystal display that is a front light crystal display and includes a liquid crystal module having a plane formed on a top portion of the liquid crystal module, comprising a light guiding module including:

a light guiding plate adapted to correspond to the plane of the liquid crystal module, the light guiding plate including a bottom adapted to face the plane of the liquid crystal module and a top opposite to the bottom of the light guiding plate;

a plurality of light guiding grooves defined in the top of the light guiding plate, each light guiding groove being oriented at a same direction and arrange regularly, the light guiding grooves parallel to one another and each having a first surface and a second surface connected to each other in a bottom of each of the light guiding grooves to form an angle between the first surface and the second surface of each of the light guiding groove;

a refracting portion laterally extending from a first side of the light guiding plate and having a cambered shape;

a light guide bar separately installed and corresponding to refracting portion, the light guide bar having a first side facing the refracting portion and a second side opposite to the first side of the light guide bar, a light outlet surface formed on the first side of the light guide bar and having a cambered concave surface, a reflecting surface formed on the second side of the light guide bar and having a plurality of reflecting grooves defined in the reflecting surface of the light guide bar;

a cambered reflecting mask separately installed and corresponding to the second side of the light guide bar; and two light source respectively disposed to correspond to a corresponding one of two opposite ends of the light guide bar.

2. The light guiding device for a liquid crystal display as claimed in claim 1, wherein the light outlet surface has a radius of curvature that is set between 0.001 to 0.01.

3. The light guiding device of a liquid crystal display as claimed in claim 1, wherein each reflecting groove has an angle that is set between 80 degrees and 100 degrees.

4. The light guiding device as a liquid crystal display as claimed in claim 1, wherein the light guiding plate of the light guiding module has two sides which are respectively connected to a corresponding one of the two opposite ends of the light guide bar through a respective connecting portion.

* * * * *